United States Patent [19]

Farwaha et al.

[11] Patent Number: 5,719,244
[45] Date of Patent: Feb. 17, 1998

[54] LATEX BINDERS AND COATINGS CONTAINING POLYMERS DERIVED FROM POLYMERIZABLE SACCHARIDE MONOMERS

[75] Inventors: Rajeev Farwaha, Brampton; William D. Currie, Elmira, both of Canada; Robert W. Humphreys, Annandale; John S. Thomaides, Berkeley Heights, both of N.J.

[73] Assignee: National Starch and Chemical Investment Holding Corporation, Wilmington, Del.

[21] Appl. No.: 747,856

[22] Filed: Nov. 13, 1996

Related U.S. Application Data

[63] Continuation of Ser. No. 463,861, Jun. 5, 1995.
[51] Int. Cl.$^6$ ................................................. C08F 283/00
[52] U.S. Cl. ........................ 526/238.2; 526/238.21; 526/238.22; 526/238.23; 524/27; 524/35; 524/47; 524/54; 524/55; 524/56; 524/58
[58] Field of Search .................. 526/238.2, 238.21, 526/238.22, 238.23; 524/27, 35, 47, 54, 55, 56, 58; 106/162, 163.1, 205, 213, 214

[56] References Cited

U.S. PATENT DOCUMENTS

| | | | |
|---|---|---|---|
| 2,891,944 | 6/1959 | Bpettmer | 536/4.1 |
| 4,079,025 | 3/1978 | Young et al. | 526/238.22 |
| 4,721,760 | 1/1988 | Graafland | 526/238.23 |
| 4,843,154 | 6/1989 | Klein et al. | 536/4.1 |
| 5,010,155 | 4/1991 | Mueller | 527/301 |
| 5,064,888 | 11/1991 | Farwaha et al. | 524/157 |
| 5,173,534 | 12/1992 | Biale | 524/555 |
| 5,194,639 | 3/1993 | Conner et al. | 554/66 |
| 5,240,982 | 8/1993 | Farwaha et al. | 524/238 |
| 5,270,380 | 12/1993 | Adamson et al. | 524/556 |
| 5,399,617 | 3/1995 | Farwaha et al. | 524/815 |
| 5,488,102 | 1/1996 | Vetter | 536/32 |

FOREIGN PATENT DOCUMENTS

| | | |
|---|---|---|
| 0 237 131 | 3/1987 | European Pat. Off. . |
| 0 336 129 A2 | 3/1989 | European Pat. Off. . |
| 0 383 023 A2 | 1/1990 | European Pat. Off. . |
| 0 220 676 A1 | 10/1986 | Germany . |
| WO 92/06984 | 4/1992 | WIPO . |
| WO 92/08687 | 5/1992 | WIPO . |

OTHER PUBLICATIONS

B.D. martin, S.A. Ampofo, R.J. Linhardt, J.S. Dordick, "Biocatalytic Synthesis of Sugar–Containing Poly(acrylate)– Based Hydrogels, Macromolecules", vol. 25, No. 26, Dec. 21, 1992.

J. Klein, "synthesis of some poly(vinylsaccharide)s of the amide type and investigation of their solution properties", Makromol. Chem., 188, 1217–1232 (1987).

J. Klein, "New surfactant polymers based on carbohydrates", Makromol. Chem. 191, 517–528 (1990).

S. Matsumura, H. Kubokawa, K. Toshima, "Enzymatic synthesis of novel monomers bearing β–D–galactopyranoside residue", Makromol. Chem., Rapid Commun. 14, 55–58 (1993).

S. Demharter, W. Richtering, R. Mulhaupt, "Emulsion polymerization of styrene in the presence of carbohydrate0–based amphiphiles", Polymer Bulletin 34, 691–698 (1995).

J. Revilla, A. Elaissari, C. Pichot, B. Gallot, "Surface Functionalization of Polystyrene Latex Particles with a Liposaccharide Monomer", Polymers for Advanced Technologies, vol. 6, pp. 456–464, Oct. 1994.

M.C. Davies, R.A.P. Lynn, S.S. Davis, J. Hearn, J.C. Vickerman, A.J. Paul, "The application of Time–of–Flight SIMS for the Surface Characterization of Polymer latex Particles Prepared with Immobilized Sugar Residues", Journal of Collid and Interface Science 161, 83–90 (1993).

M.C. Davies, R.A.P. Lynn, S.S. Davis, J. Hearn, J.F. Watts, J.C. Vickerman, A.J. Paul, "Preparation of Polymer Latex Particles with Immobilized Sugar Residues and Their Surface Characterization by X–ray Photoelectron Spectroscopy and Time–of–Flight Secondary Ion Mass Spectrometry", 1993 American Chemical Society vol. 9, pp. 1637–1645.

M.T. Charreyre; P. Boullanger, T. Delair, B. Mandrand, C. Pichot, "Preparation and characterization of polystyrene latexes bearing disaccharide surface groups", Colloid & Polymer Science, Colloid Polym Sci 271:668–679 (1993).

*Primary Examiner*—Nathan M. Nutter
*Attorney, Agent, or Firm*—William K. Wissing

[57] ABSTRACT

Latex binders are disclosed which are used to prepare freeze-thaw-stable latex coating compositions which may be free of volatile freeze-thaw/open-time additives. The latex binders are prepared by combining a polymer which is the polymerization product of a polymerizable saccharide monomer, an acrylic monomer and, optionally, a monomer selected from styrenic monomers, ionic monomer and wet adhesion monomers. The latex coating compositions are freeze-thaw stable, even in the total absence of a volatile freeze-thaw additive, and exhibit improved open-time when compared to a latex coating composition which does not contain a volatile freeze-thaw additive. Methods for preparing the freeze-thaw-stable latex coating compositions are also disclosed.

19 Claims, No Drawings

LATEX BINDERS AND COATINGS CONTAINING POLYMERS DERIVED FROM POLYMERIZABLE SACCHARIDE MONOMERS

This application is a continuation of application Ser. No. 08/463,861, filed Jun. 5, 1995.

FIELD OF THE INVENTION

This invention relates to latex binders and coating compositions which utilize as a polymeric binder a copolymer of an acrylic monomer and a polymerizable saccharide monomer. The latex coating compositions have improved open-time and are freeze-thaw-stable even in the absence of volatile freeze-thaw/open-time additives.

BACKGROUND OF THE INVENTION

Latex based coatings, such as paints, stains, adhesives, and printing inks, are being increasingly used because of their safety, economy, ease of application, and ease of clean-up. Aqueous coatings such as latex paints, dry quickly compared to solvent coatings such as alkyd paints. Because of the faster drying time of aqueous coatings relative to solvent coatings, a second coat can be applied in a short time, for example, from about 3 to about 5 hours. However, because of the fast drying nature of aqueous coatings, there is often not enough time to rebrush over the freshly coated wet surface to improve its appearance or to apply additional paint onto the freshly coated wet surface without causing defects such as brush marks, loss of gloss, or lap lines in the final dried coating. A "lap" as used herein, refers to an area on a substrate where additional coating is applied onto a portion of a previously coated, but still wet, adjacent substrate area.

In the case of paint, it is desirable to seamlessly join up the edges of a wet painted area with newly added fresh paint without any visible lap showing in the dried coating. "Lapping" or "to lap" refers to the ability to do this seamless joining of edges without leaving a visible "lap" line. As used herein, "open time" or "wet-edge time" refers to the time that a coating remains workable, after it has been applied to a substrate, to allow for rebrushing or "melting in" of the newly applied coating at the lap, without resulting in the above defects. Open time is a more apparent problem in cases where other than a flat or dull surface appearance is desired, such as with sheen and gloss paints, because a glossy appearance makes the surface defects more visible.

The drying characteristics of aqueous coatings, such as dry time, flow and gloss of the dried coating, are not easily controlled because they are dependent on how fast the water in the coating evaporates. During the drying of the aqueous coating, as water evaporates, polymer particles in the latex binder deform and fuse together to form a continuous film. This process, known as "film formation" or "coalescence", is irreversible since the addition of water onto the dried or drying coating will not redisperse the polymer particles. Once coalescence occurs, it is impossible to rebrush the aqueous coating and lap into a previously coated area. The drying behavior of aqueous coatings depends on the temperature, humidity and air velocity at the time of application and thereafter. For example, coatings can dry almost instantaneously under hot, dry, or windy conditions, leading to poor lapping characteristics and short open times. In addition, these conditions also tend to impair the quality of film formation, which can result in cracks, poor flow, low gloss, and poor adhesion to the substrate.

The conventional practice for addressing the quick drying nature of aqueous coatings has been to add substantial levels of water-soluble solvents, for example, 10 to 20 percent or more based on total liquid content, to such coatings to increase the open time. These techniques are discussed by M. D. Andrews, "Influence of Ethylene and Propylene Glycols on Drying Characteristics of Latex Paints", *Journal of Paint Technology*, vol. 46, page 40 (1974); D. A. Sullivan, "Water and Solvent Evaporation from Latex and Latex Paint Films", *Journal or Paint Technology*, vol. 47, page 60 (1975); and C. R. Martens, *Waterborne Coatings*, Van Nostrand Reinhold, page 153 (1981). These references discuss the use of short chain water-soluble alcohols and glycols as cosolvents in references discuss the use of short chain water-soluble alcohols and glycols as cosolvents in aqueous coatings to aid coalescence of the latex particles, improve levelling, and prolong open time. However, these cosolvents negate the intrinsic advantages of aqueous coatings, such as safety, low tack, low odor, and low pollution.

In addition to enhancing open time of latex coatings, such water-soluble solvents also provide freeze-thaw stability to the latex-based coatings. One is faced then with the problem of preparing latex based binders and coatings which do not utilize such solvents or which utilize significantly reduced amounts of such solvents, yet which exhibit open-time and freeze-thaw stability which are as good as or better than those of latex binders and coatings which utilize such solvents at levels which are effective to provide freeze-thaw-stable latex binders and coating compositions.

SUMMARY OF THE INVENTION

The present invention is directed to freeze-thaw-stable latex coating compositions which may be free of volatile freeze-thaw additives and to methods for preparing the latex coating compositions. The inventive latex coatings exhibit improved open-time compared to latex coatings which do not contain volatile freeze-thaw/open-time additives. The coating compositions utilize as a latex binder an emulsion which comprises a polymer which is the polymerization product of a polymerizable saccharide monomer, at least one acrylic monomer and, optionally, a monomer selected from the group consisting of a styrenic monomer, an ionic monomer and a wet adhesion monomer. The saccharide monomer comprises the residue of a single, $\alpha,\beta$-ethylenically unsaturated moiety covalently bonded to the residue of a saccharide moiety. The saccharide monomer is present in amounts effective to provide a freeze-thaw-stable latex coating composition. The invention is also directed to the latex binders and the polymers which are used to prepare the latex coating compositions of the present invention.

DETAILED DESCRIPTION OF THE INVENTION

According to the present invention, it has been discovered that latex binders and latex coating compositions which are freeze-thaw stable may be prepared without the use of volatile freeze-thaw good as or better than latex binders and coating compositions which contain conventional volatile freeze-thaw/open-time additives. The latex coating compositions of the present invention have improved open-times compared to latex coating compositions which contain no volatile freeze-thaw/open-time additives. Such comparative latex compositions, in addition to having inferior open-time, are not freeze-thaw stable. In preparing the saccharide monomers used to prepare the polymers of the present invention, the residue of a single, α,β-ethylenically unsaturated moiety is covalently bonded to the residue of a saccharide moiety. Generally, the saccharide moiety used to prepare the monomers of the present invention may be a reducing sugar or may be composed of glycosyl units connected by glycosidic linkages. These saccharides may have one reducing end-group, although this is not required. They can be linear or branched, and they may be composed of a single type of glycosyl unit or they may be composed of two or more different types of glycosyl units. Exemplary saccharides according to the present invention include, without limitation, starches, hydrolyzed starches, glucose, galactose, maltose, lactose, maltodextrins, corn syrup solids, cellulose, hydrolyzed cellulose, dextran, hydrolyzed dextran, guar gum, hydrolyzed guar gum, locust bean gum and hydrolyzed locust bean gum. Such starches include, for example, corn, potato, tapioca and rice starches.

The α,β-ethylenically unsaturated moiety serves as the polymerizable functionality in the saccharide monomer which allows copolymerization of the saccharide monomer and the acrylic monomer. Accordingly, the α,β-ethylenically unsaturated moiety may be any of those moieties which will copolymerize readily with an acrylic monomer, as that term is used herein. Such unsaturated moieties comprise, for example, allyl, acrylate, methacrylate and styrenic functionality. Preferred α,β-ethylenically unsaturated moieties include acrylamide, methacrylamide and α-methyl styryl moieties. Particularly preferred is 3-isopropenyl-α,α-dimethylbenzylisocyanate.

The saccharide monomers may be prepared by a number of methods. For instance, reductive amination, with or without a solvent, may be used to prepare the saccharide monomers. Additionally, the monomers may be prepared by using the enzyme β-galactosidase to transfer lactose to 2-hydroxyethyl (meth)acrylate or by lipase catalyzed transesterification of an active ester of acrylic acid, such as vinyl acrylate, with sacharides or saccharide derivatives.

There are provided acrylic polymers which comprise the polymerized residue of an acrylic monomer and a polymerizable saccharide monomer represented by structure III,

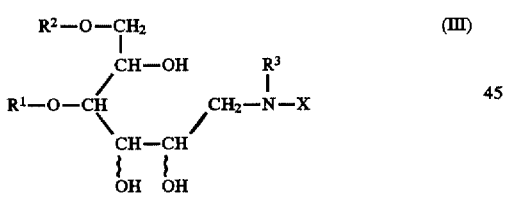

wherein $R^1$, $R^2$ and $R^3$ are as defined herein below and X is the residue of the α,β-ethylenically unsaturated moiety. Preferably, X is the residue of a moiety selected from the group consisting of acrylamide, methacrylamide and α-methyl styryl moieties.

The preferred methods used to prepare the saccharide monomers, reductive amination, preferably utilize only water as the reaction solvent and preferably are free of a cosolvent. In one embodiment, the process comprises mixing together, in water and in the absence of a cosolvent, a saccharide moiety of structure (I) with an amine of the formula $R^3NH_2$, where $R^3$ may be $C_1$–$C_{18}$ alkyl, H or $NH_2$. The admixture of the saccharide and the amine are contacted with pressurized hydrogen, in the presence of a Group VIIIB metal catalyst and under conditions effective to produce an amino saccharide of structure (II). The amino saccharide is reacted with the α,β-ethylenically unsaturated moiety to form a saccharide monomer of structure (III).

As used herein, the term "saccharide" is intended to include reducing sugars, oligosaccharides and polysaccharides, as those terms are known to one skilled in the art. The terms "saccharide monomers" and "polymerizable saccharide monomers" are used interchangeably herein.

Preferably, the polymerizable, saccharide monomers of the present invention are prepared by:

(a) mixing together, in water and in the absence of a cosolvent,
(i) a saccharide of structure (I);

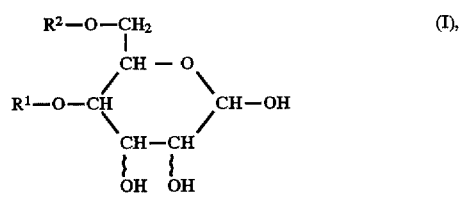

wherein,
$R^1$ is H or is represented by structure I(a)

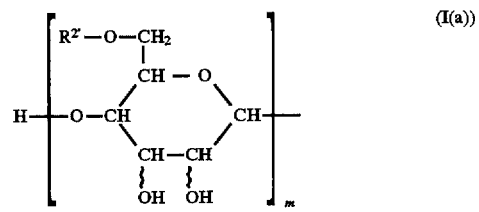

$R^2$ is H, or is represented by structure I(a) or structure I(b)

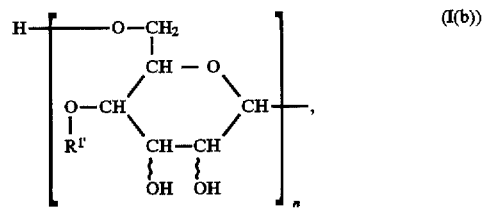

wherein
$R^{1'}$ is H or is represented by structure I(a),
$R^{2'}$ is H or is represented by structure I(a) or structure I(b), and
m and n are greater than or equal to 0, and (ii) an amine selected from the group consisting of $R^3NH_2$, where $R^3$ is selected from the group consisting of a $C_1$–$C_{18}$ alkyl group, H or $NH_2$, thereby producing an aqueous admixture of the saccharide and the amine, (b) contacting the aqueous admixture of the saccharide and the amine with hydrogen, under pressure, in the presence of a Group VIIIB metal catalyst and under conditions effective to produce an amino saccharide of structure (II);

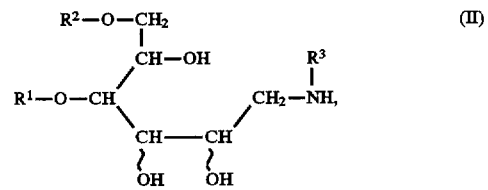

wherein
$R^1$, $R^2$, $R^3$, $R^{1'}$, $R^{2'}$, m and n are as above, (c) adding the α,β-ethylenically unsaturated moiety to the amino saccharide; and (d) mixing the amino saccharide and the α,β-ethylenically unsaturated moiety under conditions effective to produce a saccharide monomer of structure (III), wherein $R^1$, $R^2$, $R^3$, $R^{1'}$, $R^{2'}$, X, m and n are as above and wherein the catalyst and excess amine are removed from the reaction.

In preferred embodiments, the methods of preparing the saccharide monomers exclude the use of a cosolvent with the water throughout the process for preparing the saccharide monomers. Cosolvent, as used herein, is intended to include organic solvents, such as alcohols, ketones, and polar aprotic solvents such as dimethyl sulfoxide, dimethyl formamide and pyridine. Cosolvent, as used herein, is also intended to include excess amine utilized in the process to the extent that the amine is present in amounts effective to function as a solvent in the process.

In forming the admixture of the saccharide of structure (I) and the amine, the saccharide and the amine are mixed together in water and in the absence of a cosolvent until an admixture thereof is formed. In preferred embodiments, the saccharide is added to water and blended until the saccharide is either dissolved in the water or homogeneously dispersed in the water. The saccharide/water mixture is added to the amine and blended, preferably at temperatures less than about 10° C., for a time effective to form an admixture of the saccharide and the amine, typically at least about one hour.

Preferred saccharide moieties used to prepare the polymers of the present invention are represented by structure (I), where $R^1$ and $R^2$ are as set forth herein above. In particularly preferred embodiments, the polysaccharide is a starch represented by structure (I) where $R_1$ is represented by structure I(a) and $R^2$ is represented by structure I(a) or is H. The amine used in the present invention is selected from the group consisting of $R^3NH_2$, where $R^3$ may be a $C_1$–$C_{18}$ alkyl group, H or $NH_2$. Preferably, $R^3$ is a $C_1$–$C_3$ alkyl group. More preferably, the amine is methyl amine. Preferred α,β-ethylenically unsaturated moieties comprise an α-methyl styryl moiety, most preferably, 3-isopropenyl-α, β-dimethylbenzylisocyanate.

In the preferred embodiments, the admixture of the saccharide and the amine are contacted with hydrogen, under pressure and in the presence of a Group VIIIB metal catalyst, for a period of time effective to produce an amino saccharide of structure (II). Preferably, the admixture of the saccharide and the amine is placed in a reactor with the Group VIIIB metal catalyst and the contents brought to a temperature adequate to facilitate the formation of the amino saccharide. Preferably, the temperature is from 10° C. to 100° C., more preferably from 40° C. to 60° C. The metal catalyst utilized may comprise any of the Group VIII metals, with nickel, palladium, platinum and ruthenium being preferred. Particularly preferred catalysts are Raney nickel catalyst and supported nickel catalysts such as those available from United Catalysts Inc., Louisville, Ky., under the trade name G-49B. The reactor is purged with nitrogen or a comparable inert gas and pressurized with hydrogen. The pressure will be effective to facilitate the reaction between the saccharide and the amine. Generally, the higher the pressure, the quicker is the reaction. Preferably the pressure will be at least about 100 psi, more preferably at least about 700 psi. The contents of the reactor are mixed until the reaction is substantially completed. Typically, the contents are mixed for about 8 to 20 hours, preferably about 12 hours. The temperatures and pressures noted above are not intended to limit the scope of the claims appended hereto. As one skilled in the art will recognize, once armed with the present specification, the conditions of temperature and pressure may be selected such that the reaction rate and product yield may be optimized.

After the amino saccharide has been formed, the catalyst must be removed therefrom. While one skilled in the art will appreciate that there are various means to remove the catalyst, in preferred embodiments, the catalyst is removed via filtration. The amino saccharide may be further concentrated to a solid, if so desired, and redissolved in water prior to forming the saccharide monomers of the present invention. Preferably, after the catalyst is removed, 3-isopropenyl-α,α-dimethylbenzylisocyanate is added to the amino saccharide and the two are mixed under conditions effective to produce the saccharide monomer.

In preferred embodiments, a stoichiometric excess of the amine is mixed with the saccharide to facilitate the reaction of the saccharide with the amine. Without intending to be limited by the following, as the amino saccharide is formed, a less preferred reaction between the amino saccharide and the saccharide is believed to take place. A stoichiometric excess of the amine is used to facilitate the preferential reaction between the saccharide and the amine. It is preferred that the excess amount of amine used in the process be minimized, as any excess amine must be removed prior to the reaction of the amino saccharide with the 3-isopropenyl-α,α-dimethylbenzylisocyanate. In addition, the amine is not used in excess amounts to the extent that it will function as a solvent in the process. Preferably, the saccharide and amine are used at molar ratios of 1:1 to 1:2, preferably from 1:1 to 1:1.5.

The amino saccharide and the 3-isopropenyl-α,α-dimethylbenzylisocyanate are preferably combined in molar ratios ranging from about 0.8:1 to about 1.2:1, respectively. In more preferred embodiments, the amino saccharide and the 3-isopropenyl-α,α-dimethylbenzylisocyanate are combined in equimolar amounts. The preferred monomers of the present invention are unique in that they will copolymerize readily with acrylic monomers such as (meth)acrylates, yet will not homopolymerize due to the nature of the α-methyl styryl moiety. This property of the saccharide monomers is particularly advantageous where selective copolymerization with the acrylic comonomer is desired, without the formation of saccharide homopolymers. This not only provides more homogeneous copolymers, but also allows one to minimize the amount of saccharide monomer required to prepare the particular copolymer which contains the saccharide monomers. As the saccharide monomers are monofunctional, i.e., they contain a single, polymerizable α-methyl styryl moiety, crosslinking and gelling are avoided during polymerization.

The polymer will comprise the polymerized residue of an amount of the saccharide monomer which is effective to provide freeze-thaw-stable latex coating compositions which may be substantially free of volatile freeze-thaw/open-time additives. Preferably, the polymers will comprise a sufficient amount of the saccharide monomer residue to provide freeze-thaw-stable latex binders and latex coating compositions which are free of volatile freeze-thaw/open-time additives. The saccharide monomer should be used in such effective amounts as a minimum, although more of the saccharide monomer may be used where desired or required. While not intending to be limited by the following, it is believed that excess amounts of the saccharide monomer may increase the hydrophilicity of the film to the extent that abrasion (or scrub) resistance may be significantly reduced to the point where the latex binders and latex coating compositions no longer perform as intended or required.

Therefore, the saccharide monomer should not be used in amounts which are so high as to adversely affect the abrasion resistance of the coating film. The abrasion resistance will depend also on the particular composition of the latex coating composition. Therefore, the upper limit of the saccharide monomer utilized will depend in part on the specific latex coating composition in which it is used. However, one skilled in the art, once armed with the present specification, will be able to determine readily the upper limit of the saccharide monomer with respect to sufficient abrasion resistance. Generally, the polymer will comprise the polymerized residue of at least 0.5 pphm (parts by weight per hundred parts by weight of acrylic monomer used to prepare the polymer) of the saccharide monomer, preferably at least 1 pphm of the saccharide monomer, and more preferably, from about 0.5 pphm to about 10 pphm of the saccharide monomer. Even more preferably, the polymer will comprise the polymerized residue of from about 1 to about 5 pphm of the saccharide monomer.

The polymer will also comprise the polymerized residue of at least one acrylic monomer which is copolymerizable with the saccharide monomer. The acrylic monomer is selected from the group consisting of $C_1$–$C_{10}$ alkyl esters of $\alpha,\beta$-ethylenically unsaturated monocarboxylic acids, hydroxy $C_1$–$C_4$ alkyl esters of $\alpha,\beta$-ethylenically unsaturated monocarboxylic acids and $C_4$–$C_8$ alkyl di-esters of $\alpha,\beta$-ethylenically unsaturated dicarboxylic acids. Preferably, the acrylic monomer is selected from the group consisting of $C_1$–$C_{10}$ alkyl esters of acrylic acid, $C_1$–$C_{10}$ alkyl esters of methacrylic acid and $C_4$–$C_8$ alkyl di-esters of maleic, itaconic and fumaric acids. More preferably, the polymer will comprise the polymerized residue of from about 55 to 99.5 weight percent of a $C_1$–$C_8$ alkyl ester of acrylic acid, based on the sum total weight of the saccharide monomer, the acrylic monomer, the styrenic monomer, the ionic monomer and the wet adhesion monomer. Particularly preferred acrylic monomers include methyl acrylate, ethyl acrylate, butyl acrylate, 2-ethyl hexyl acrylate, decyl acrylate, methyl methacrylate, butyl methacrylate, i-butyl methacrylate, i-bornyl methacrylate, hydroxy ethyl acrylate and hydroxy ethyl methacrylate.

The polymer may also comprise the polymerized residue of from 0 to about 70 pphm of a styrenic monomer. Such styrenic monomers include, for example, styrene, halogenated styrene and alkyl-substituted styrene.

The polymer may also comprise the polymerized residue of from 0 to about 2 pphm of an ionic monomer. When used, the ionic monomer will be present in an amount from 0.2 to about 2 pphm. In preferred embodiments, not more than 1 pphm of the ionic monomer is used. The ionic monomers may be utilized to impart mechanical stability to the latex binder, i.e., they are stable upon application of shear to the latex binders, such as during pumping of the latex binder and/or the paint compositions during processing and during addition of the latex binder to the "grind" portion of the paint formulation during the preparation thereof. The "grind" is that portion of the paint formulation which includes the pigments, fillers and the like. The pigments and fillers are "ground" using conventional mixing techniques, to a particular Hegman dispersion value. The grind is then "let down", that is, the balance of the paint composition, including the latex binder and any balance of water, are added to the grind and mixed. Typical classes of ionic monomers include, but are not limited to, $\alpha,\beta$-ethylenically unsaturated monocarboxylic and dicarboxylic acids and the alkyl half-esters of maleic acid, maleic anhydride, fumaric acid, and itaconic acid. Exemplary ionic monomers include acrylamido methyl propane sulfonic acid, styrene sulfonate, sodium vinyl sulfonate, acrylic acid and methacrylic acid. Particularly preferred ionic monomers include acrylic acid and methacrylic acid.

In order to optimize the wet adhesion of the latex paint formulation, the polymer may comprise the polymerized residue of from 0 to about 2 pphm of a wet adhesion monomer, or a combination of wet adhesion monomers. These monomers are well known in the art and include aminoethyl acrylate and methacrylate, dimethylaminopropylacrylate and methacrylate, 3-dimethylamino-2,2-dimethylpropyl-1-acrylate and methacrylate, 2-N-morpholinoethyl acrylate and methacrylate, 2-N-piperidinoethyl acrylate and methacrylate, N-(3-dimethylaminopropyl) acrylamide and methacrylamide, N-(3-dimethylamino-2,2-dimethylpropyl) acrylamide and methacrylamide, N-dimethylaminomethyl acrylamide and methacrylamide, N-dimethylaminomethyl acrylamide and methacrylamide, N-(4-morpholinomethyl) acrylamide and methacrylamide, vinylimidazole, vinylpyrrolidone, N-(2-methacryloyloxyethyl) ethylene urea, N-(2-methacryloxyacetamidoethyl)-N, N'-ethyleneurea, allylalkyl ethylene urea, N-methacrylamidomethyl urea, N-methacryoyl urea, N-[3-(1,3-diazacrydohexan)-2-on-propyl]methyacrylamide, 2-(1-imidazolyl) ethylmethacrylate, 2-(1-imidazolidin-2-on) ethylmethacrylate, N-(methacrylamido)ethyl urea (DV2422, Rhone-Poulenc) and allyl ureido wet adhesion monomer (Sipomer WAM®, Rhone Poulenc). When utilized, the wet adhesion monomer will be present in an amount from 0.2 to 2 pphm.

The emulsion polymerization of the polymer can be accomplished by known procedures for polymerization in aqueous emulsion. Optionally, conventional seeding procedures can be employed to aid in controlling polymerization to achieve the desired average particle size and particle size distribution. If seeding is employed, the polymer seed will be present in amounts that correspond to about 0.1% to 8% by weight of the total polymer, and will range in size from about 20% to 60% of the diameter of the polymer particles to be formed.

The seed latex can constitute a previously prepared latex or polymer powder, or it can be prepared in situ. The monomeric composition of the seed latex can vary; however, it is preferable that it be substantially the same as that of the polymer.

The monomer or comonomers and, optionally, the seed to be employed in the preparation of the polymer, are dispersed into water with agitation sufficient to emulsify the mixture. The aqueous medium may also contain a free radical polymerization catalyst, an emulsifying agent (i.e., surfactant), or other ingredients that are known and conventionally employed in the art as emulsion polymerization aids.

Suitable free radical polymerization catalysts are the catalysts known to promote emulsion polymerization and include water-soluble oxidizing agents, such as, organic peroxides (e.g., t-butyl hydroperoxide, cumene hydroperoxide, etc.), inorganic oxidizing agents (e.g., hydrogen peroxide, potassium persulfate, sodium persulfate, ammonium persulfate, etc.) and those catalysts that are activated in the water phase by a water-soluble reducing agent. Such catalysts are employed in a catalytic amount sufficient to cause polymerization. As a general rule, a catalytic amount ranges from about 0.1 to 5 parts per hundred parts by weight of monomer. As alternatives to heat or catalytic compounds to activate the polymerization, other free radical producing means, such as exposure to activating radiation, can be employed.

Suitable emulsifying agents include anionic, cationic, and nonionic emulsifiers customarily used in emulsion polymerization. Usually, at least one anionic emulsifier is utilized and one or more nonionic emulsifiers may also be utilized. Representative anionic emulsifiers are the alkyl aryl sulfonates, alkali metal alkyl sulfates, the sulfonated alkyl esters, and fatty acid soaps. Specific examples include sodium dodecylbenzene sulfonate, sodium butylnaphthalene sulfonate, sodium lauryl sulfate, disodium dodecyl diphenyl ether disulfonate, N-octadecyl disodium sulfosuccinate and dioctyl sodium sulfosuccinate. The emulsifying agents are employed in amounts to achieve adequate emulsification and to provide desired particle size and particle size distribution.

Other ingredients known in the art to be useful for various specific purposes in emulsion polymerization, such as, acids, salts, chain transfer agents, and chelating agents, can also be employed in the preparation of the polymer. For example, if the polymerizable constituents include a monoethylenically unsaturated carboxylic acid comonomer, polymerization under acidic conditions (pH 2 to 7, preferably 2 to 5) is preferred. In such instances, the aqueous medium can include those known weak acids and their salts that are commonly used to provide a buffered system at the desired pH range.

The manner of combining the polymerization ingredients can be by various known monomer feed methods, such as, continuous monomer addition, incremental monomer addition, or addition in a single charge of the entire amount of monomers. The entire amount of the aqueous medium with polymerization additives can be present in the polymerization vessel before introduction of the monomers, or alternatively, the aqueous medium, or a portion of it, can be added continuously or incrementally during the course of the polymerization.

Polymerization is initiated by heating the emulsified mixture with continued agitation to a temperature usually between about 50° to 100° C., preferably between 60° to 100° C. Polymerization is continued by maintaining the emulsified mixture at the selected temperature until conversion of the monomer or monomers to polymer has been reached.

Following polymerization, the solids content of the resulting aqueous heterogeneous polymer latex can be adjusted to the level desired by the addition of water or by the removal of water by distillation. Generally, the desired level of polymeric solids content is from about 20 to 60% by weight on a total weight basis.

The size of the polymer particles can vary; however, for optimum water resistance, it is preferable that the particles have an average diameter of less than 500 nanometers. In general, for the polymer of this invention, the smaller the average particle size, the more water resistant the polymer. Suitable particle sizes generally can be achieved directly from the polymerization. However, screening of the resulting latex to remove particles outside the desired size range, and thus narrowing the particle size distribution, may be employed.

Latex binders are prepared utilizing the polymers of the present invention. Depending upon the level of saccharide monomer used in preparing the polymers of the present invention, the latex binders themselves may be freeze-thaw-stable, even though they are free or substantially free of volatile freeze-thaw additives; although freeze-thaw stability of the latex binder itself is not required in order to prepare freeze-thaw-stable latex coating compositions. Preferably, the latex binders of the present invention are free of volatile freeze-thaw/open-time additives such as ethylene glycol or propylene glycol. "Volatile freeze-thaw/open-time additives", as used herein, refers to those freeze-thaw/open-time additives which diffuse out from the applied film of the latex paint and evaporate under typical ambient conditions. By typical ambient conditions, it is meant those conditions of temperature, humidity and barometric pressure under which latex coatings are typically applied and cured. By substantially free of volatile freeze-thaw additives, it is meant that the binders do not contain volatile freeze-thaw additives at levels which would provide freeze-thaw-stable latex binders in the absence of the polymerizable saccharide monomers of the present invention.

The latex binders comprise the polymer of the present invention emulsified with water, with an amount of an emulsifying agent which is effective to provide an emulsion of the polymer. The latex binders will contain an amount of the polymer which is effective to function as a polymeric binder in a latex coating composition. Polymeric binders typically are polymers which are used in latex compositions to "bind" certain components of the latex coating, such as pigments and fillers, in a film of the latex coating. The latex binders of the present invention preferably will contain from about 40 to about 60 weight percent of the polymer of the present invention, preferably from about 45 to about 55 weight percent of the polymer, based on the total weight of the latex binder. When the latex binders are used in latex coating compositions which do not employ other additives which may contribute to freeze-thaw stability, such as coalescing aids or plasticizers, the polymer must contain greater than 0.5 pphm, preferably at least 1 pphm, of the saccharide monomer. When the latex binder is to be used in latex coating compositions which employ such coalescing aids or plasticizers, then the polymer may comprise as little as 0.5 pphm of the saccharide monomer. The emulsifying agent in the latex binder preferably is present in amounts ranging from about 1 to about 5 weight percent, based on the total weight of the latex binder. For various applications, it is sometimes desirable to have small amounts of additives, such as, surfactants, bactericides, pH modifiers, and antifoamers, incorporated in the latex binder. This may be done in a conventional manner and at any convenient point in the preparation of the latex binders.

Freeze-thaw-stable latex coating compositions which are free or substantially free of volatile freeze-thaw/open-time additives are prepared utilizing the latex binders of the present invention in amounts effective to provide the latex coating composition which is freeze-thaw-stable and which has an open-time which is as good as or better than latex coatings which contain volatile freeze-thaw/open-time additives in amounts effective to provide freeze-thaw-stable latex binders and coatings. As noted above, by substantially free of volatile freeze-thaw/open-time additives, it is meant that the coating compositions do not contain volatile freeze-thaw/open-time additives at levels which would provide freeze-thaw-stable latex coatings in the absence of the polymers of the present invention. For instance, propylene glycol may be used in conventional latex coatings at levels of about 3 weight percent, based on the total weight of the latex composition. At some point, the latex composition will not be freeze-thaw-stable as the amount of the propylene glycol is reduced.

As one skilled in the art will appreciate, once armed with the present specification, the latex coating compositions of the present invention may contain volatile freeze-thaw/open-time additives at conventional levels or reduced levels. Preferably, the latex coatings of the present invention will contain less than about 2 weight percent of a volatile freeze-thaw/open-time additive, and even more preferably less than about 1 weight percent of a volatile freeze-thaw/open-time additive. However, for the full benefits of the present invention to be realized, both economically and environmentally, the latex coating compositions according to the present invention are free of volatile freeze-thaw/open-time additives. Such latex coatings have improved open-time when compared to latex coating compositions which do not contain volatile freeze-thaw/open-time additives.

Latex-based coatings according to the present invention include, for example, latex-based adhesives and paints. The latex adhesives are formulated using techniques known to those skilled in the art of manufacturing latex adhesives. Preferred latex coating compositions according to the present invention are latex paint compositions. The latex paints are formulated using techniques known to those skilled in the art of manufacturing latex paint. Generally, water, defoamer, stabilizer, pigment, filler and surfactant are combined to form the grind, where the pigments and fillers are ground to a desired particle size as indicated by a Hegman reading of 2 to 3. Additional water, latex binder, rheology modifiers, biocides and the like are added to the grind and the entire batch is blended and adjusted to desired Hegman readings and viscosity.

Methods of preparing freeze-thaw-stable latex coating compositions which are free or substantially free of volatile freeze-thaw additives also are provided. In preferred methods, the latex coating compositions prepared are free of volatile freeze-thaw/open-time additives. The methods comprise providing a latex binder according to the present invention in amounts effective to function as a binder in a latex coating composition, and combining with the latex binder at least one ingredient selected from the group consisting of a defoamer, a pigment, a filler, a rheology modifier, a surfactant, a coalescing aid, a neutralizing agent and a biocide, wherein said latex coating composition is freeze-thaw-stable and is substantially free of a volatile freeze-thaw-additive, and wherein said latex coating composition has improved open-time when compared to a latex coating composition which does not contain a volatile freeze-thaw additive or the polymer which contains the polymerized residue of the saccharide monomer.

The following test procedures were used to evaluate comparative and inventive latex binders and latex paint compositions.

Freeze-Thaw Stability

The latex binder (or latex paint) sample was transferred into a 350 ml lined metal can and was kept in the freezer for 16 hours at $-18°$ C. Then the sample was removed from the freezer and was allowed to thaw for 8 hours at room temperature. The sample was observed for flow properties, lump formation, and coagulation. The sample was considered to pass if it had no coagulation at all. This cycle of freezing-thawing was repeated until the sample coagulated, indicating freeze-thaw failure, or until a total of five cycles were successfully completed, which indicated that the sample was freeze-thaw-stable.

Abrasion Resistance (Scrubability)

A test scrub panel was prepared by drawing a 7 mil film of paint on a black scrub panel (leneta form P121-10N) and allowing the paint to dry for 7 days in an open room kept at $23°\pm2°$ C. and $50\pm5\%$ relative humidity. The dried, test scrub panel was affixed to a cleaned glass plate which had affixed across the center thereof a brass shim. The glass plate with the test scrub panel affixed thereto was put into the holding basin of a scrub machine equipped with a nylon scrub brush. The nylon bristles of the brush were prepared by immersing in a 1% solution of Triton X-100 overnight. The brush was placed in the brush holder above the test basin. The brush bristles was spread evenly with 10 grams of a standardized scrub medium (abrasive type SC-2, available from Leneta Co.). The panel was then wet with 5 ml of deionized water in the path of the brush. The scrub machine was started. After every 400 cycles (800 strokes) before failure, to the brush were added 10 grams of scrub medium and 5 ml of deionized water. The number of brush strokes to the paint at which 0.5 inch of black chart shows through the test panel was recorded.

Open Time

The paints were separately brushed out lengthwise on half of a coated paper chart (10H-BW Spreading rate Chart). At three minute intervals, a second coat of each test paint was brushed lengthwise, in separate sections, from an unpainted area of the chart into the first coat to overlap at least half of the first coat. The paints were dried at R.T. The open time was defined as the minimum time of which the second coat of paint blended in well with the first coat at the overlap. By this, we mean that the maximum time (open time) was established as the last three minute interval before which flow, levelling and brushmarks of the overlapped area were noticeably different than the first coat. After establishing the open time to 3 minute intervals, the above test was repeated by doing one minute intervals.

The following examples are in no way meant to limit the breadth of the claims appended hereto, but are submitted merely to present preferred embodiments of the present invention.

Example 1: Preparation of the Polymerizable Saccharide Monomer

A: Reductive Amination $\alpha$D-Lactose monohydrate (100 g, 0.28 mole) was dissolved in water (150 ml) with the aid of stirring and heating. The solution was cooled to room temperature then added over two hours to a solution of methylamine (40% w/w in water, 43 g, 0.55 mole) in water (50 ml) while stirring under nitrogen gas and holding at 0° to 10° C. The resultant mixture was stirred for a further one hour, and then it was poured into a pressure vessel and United Nickel Catalyst G-49B (10 g) was added. The pressure vessel was then heated at 55° C. under an atmosphere of 700 p.s.i. hydrogen gas for 24 hours. After this time the reaction vessel was depressurized and the catalyst was removed by filtration through filter paper and then through Celite. A small sample of the filtrate was evaporated to dryness on a vacuum pump then titrated versus dilute hydrochloric acid to determine that the reaction was complete. The rest of the sample was evaporated to low volume, to ensure removal of excess methylamine, after which it was treated directly with 3-isopropenyl-$\alpha,\alpha$-dimethylbenzylisocyanate as detailed below.

B. Urea Formation

To a solution of N-methyl-D-lactamine (95 g, 0.27 mol) in water (350 ml) was added 3-isopropenyl-$\alpha,\alpha$-dimethylbenzylisocyanate (54 g, 0.27 mole) and the resultant two phase mixture was vigorously stirred for ten hours. The course of the reaction was monitored by observance of the disappearance of the isocyanate peak at $-2250$ $cm^{-1}$ in an infra-red spectrum obtained of the reaction mixture. A small amount of an off-white precipitate formed and was removed by filtration. Unreacted aminosaccharide (<5%), as determined by titration of the reaction mixture versus dilute hydrochloric acid, was removed by the addition of Amberlite IR-120 (plus) ion exchange resin and stirring for four hours. The resin was then filtered and the solution was freeze dried to yield a white solid (143 g, 96%) whose NMR data was consistent with the structure proposed.

Additional saccharide monomers were prepared according to the above procedure, wherein the α-D-lactose monohydrate was replaced with glucose, galactose, maltose, corn syrup solids with Dextrose Equivalent (DE)=24 and maltodextrin with DE=10, respectively. The monomer prepared utilizing maltodextrin DE=10 was designated Monomer A, while the monomer prepared utilizing maltose was designated Monomer B.

Example II

An acrylic latex binder was prepared according to the formula and procedure given below.

| Ingredients | Concentration in pphm |
| --- | --- |
| Water | 25.3 |
| Monomer Mix | |
| Water | 26.6 |
| Dodecylbenzene Sulfonate (23%) | 4.3 |
| Methacrylic Acid | 0.8 |
| Methyl Methacrylate (MMA) | 53.0 |
| Butyl Acrylate (BA) | 47.0 |
| Initiator | |
| Water | 18.0 |
| Ammonium Persulfate | 0.4 |
| Reducer | |
| Water | 19.0 |
| Sodium Formaldehyde Sulfoxylate | 0.3 |

In a 3 liter vessel, equipped with a reflux condenser, addition funnels, and stirrer, an initial water charge was added to the reactor with agitation at 100 rpm. The reactor was heated to 55° C. A 22 grams portion of the monomer mix and 10 grams of reducer solution followed by 10 gm of initiator solution was charged to the reaction vessel and the reaction mixture was held for 20 minutes at 55° C. The remainder of the monomer mix was metered into the reaction over a period of 4 hours. The initiator and reducer solutions were metered to the reactor over a period of 4 hour 15 minutes. The reaction was then held for 10 minutes at 55° C. and was cooled to room temperature. As the reaction mixture was cooling down, 0.3 gram of t-butyl hydroperoxide in 5 grams of water and 0.3 gram of sodium formaldehyde sulfoxylate were added when the temperature of the reaction was at 55° C. The pH of the dispersion latex was adjusted to between 7 to 8 by the addition of 26.6% aqueous ammonium hydroxide solution.

The resulting comparative latex binder was designated 1A and had the following physical properties: % Solids 49.3; PS (nm) 200; Grits (200M) 0.006; pH 7.9.

Latex binders (1B–1F), containing respective polymerizable saccharide monomers at respective levels of use, as noted in Table 1, were made following the polymerization procedure used to prepare latex binder 1A. Latex binders 1A–1F were tested for freeze-thaw stability according to the following procedure. Results are set forth in Table 1.

TABLE I

| Latex Binder | 1A | 1B | 1C | 1D | 1E | 1F |
| --- | --- | --- | --- | --- | --- | --- |
| Monomer A* | x | 0.5 | 1.0 | 2.0 | 4.8 | x |
| Monomer B* | x | x | x | x | x | 3.0 |
| Product Properties: | | | | | | |
| % Solids | 50.4 | 49.3 | 51.3 | 51.0 | 50.0 | 50.0 |
| PS (nm) | 200 | 201 | 218 | 222 | 225 | 212 |
| % Grits (200M) | .006 | .003 | .005 | .003 | .001 | .002 |
| pH | 7.8 | 7.9 | 8.0 | 7.8 | 8.0 | 8.0 |
| F/T Stability (−18° C.) (cycles passed) | 0 | 0 | 5 | 5 | 5 | 5 |

* = pphm (parts by weight per hundred parts by weight of acrylic monomer)

Example III

Latex binders 1A–1F were formulated in the semi-gloss paint formula (I) and were tested for abrasion resistance and freeze-thaw stability. Latex binders 1A–1F were formulated in the semi-gloss paint formula (II) and were tested for open time and freeze-thaw stability. The results are set forth in Table 2.

| Semi-Gloss Formula I PVC 25% | |
| --- | --- |
| Propylene Glycol | 40.0 |
| Colloid 226-35 | 7.5 |
| Colloid 643 | 3.0 |
| Water | 71.0 |
| Titanox 2020 | 300.0 |
| Omya 3 | 50.0 |
| Disperse 5-6 Hegman | |
| Water | 182.0 |
| Methocel J3MS\premix | 4.5 |
| Water | 30.0 |
| Rexol 25/9 | 4.0 |
| Texanol | 10.0 |
| AMP-95 | 3.0 |
| Water | 11.0 |
| Nuosept 95 | 0.5 |
| Colloid 643 | 6.0 |
| Latex binder (50% Solids) | 583.0 |
| | 1305.5 |

| Semi-Gloss Formula II Semi-Gloss PVC 25% (Without Glycol) | |
| --- | --- |
| Water | 222.0 |
| Colloid 226-35 | 15.0 |
| Colloid 643 | 6.0 |
| Titanox 2020 | 600.0 |
| Omya 3 | 100.0 |
| Disperse 5-6 Hegman | |
| Water | 364.0 |
| Methocel J5MS\premix | 9.0 |
| Water | 60.0 |
| Rexol 25/9 | 8.0 |
| Texanol | 20.0 |
| AMP-95 | 6.0 |
| Water | 22.0 |
| Nuosept 95 | 1.0 |
| Colloid 643 | 12.0 |
| Latex binder (50% Solids) | 1166.0 |
| | 2611.0 |

1) Colloid™ 226-35 is a non-foaming, water soluble anionic dispersant available from Rhone-Poulence, Inc.

2) Colloid™ 643 is a defoamer prepared from a blend of silica derivatives and mineral oil available from Rhone-Poulenc, Inc.
3) Titanox™ 2020 is a rutile titanium oxide available from NL Chemicals.
4) Omya™ 3 is a CaCo₃ filler available from Omya Inc.
5) Methocel™ J5MS is a hydroxypropyl cellulose available from Dow Chemical Co.
6) Rexol™ 25/9 is a non-ionic surfactant available from Huntsman Chemical.
7) Texanol™ is 2,2,4-trimethylpentemediol-1,3 monoisobutyrate coalescent available from Eastman Chemical Products.
8) AMP™-95 is 2-amino-2-methyl-1 propanol available from Angus Chemical Co.
9) Nuosept™ 95 is a microbiocide available from Hüls America Inc.

TABLE 2

| Latex Binder | 1A | 1B | 1C | 1D | 1E | 1F |
|---|---|---|---|---|---|---|
| PVC 25% Semi-gloss Formula (40 lb/100 gallon glycol) | | | | | | |
| Gloss (20°/60°) | 7.7/39 | 6.8/40 | 7.7/41 | 7.0/43 | 5.8/3 | 7.3/36 |
| Scrubs (cycles to failure) | 1200 | 979 | 1080 | 859 | 924 | 897 |
| Freeze-thaw (−18° C.) cycles | 5 | 5 | 5 | 5 | 5 | 5 |
| PVC 25% Semi-gloss Formula II (No Glycol) | | | | | | |
| Freeze-thaw (−18° C.) cycles | x | 5 | 5 | 5 | 5 | 5 |
| Open Time (minutes) | 2 | 4–5 | 5 | 6 | 5 | 6 |

As indicated from the data in Table 2, all latex paint compositions formulated with the volatile freeze-thaw/open-time additive propylene glycol exhibited adequate scrub resistance and freeze-thaw stability. However, when the propylene glycol is removed from the formulation, latex paints made with latex binders according to the present invention (1B–1F) exhibited excellent freeze-thaw stability and improved open times of 2 to 3 times those of the latex paint which used the latex binder containing no saccharide monomer.

Example IV

To 98 grams of latex binder 1A were added 2 grams of Monomer A. This sample, designated latex binder 1G, was evaluated for open time and freeze-thaw stability in the semi-gloss formula II. Results are set forth in Table 3.

TABLE 3

| Latex Binder | 1A | 1G | 1C |
|---|---|---|---|
| Open Time (min) | 2–3 | 3 | 5 |
| Freeze-thaw −18° C. (cycles passed) | 0 | 0 | 5 |

This example shows the criticality of polymerizing the saccharide monomer with the acrylic monomers (1C), as opposed to post addition of the saccharide monomer to the pre-formed acrylic polymer (1G).

Example V

To 97 grams of latex binder 1A were added 2.65 grams of an amino-saccharide prepared as in Example 1A utilizing maltodextrin DE=10. The amino-saccharide was not further processed to covalently bond the 3-isopropenyl-α,α-dimethylbenzylisocyanate to the residue of the saccharide moiety. This sample was designated latex binder 1H. Latex 1H was formulated in semi-gloss Formula II and tested for freeze-thaw stability and open time. Results are set forth in Table 4.

TABLE 4

| Latex Binder | 1A | 1C | 1H |
|---|---|---|---|
| Open Time (min) | 3 | 5 | 3 |
| Freeze-thaw −18° C. (cycles passed) | 0 | 5 | 0 |

This example again shows the criticality of polymerizing the saccharide monomer with the acrylic monomer (latex binder 1C), as opposed to post adding a nonpolymerizable saccharide which does not contain a single, α,β-ethylenically unsaturated moiety.

We claim:

1. A polymer for use in preparing latex binders and latex coating compositions, said polymer comprising the polymerized residue of:

a polymerizable saccharide monomer represented by Structure III,

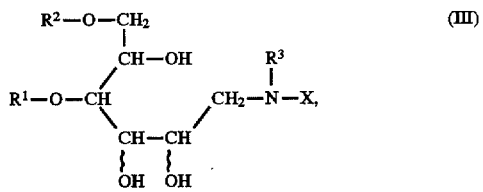

wherein, $R^1$ is H or is represented by structure I(a)

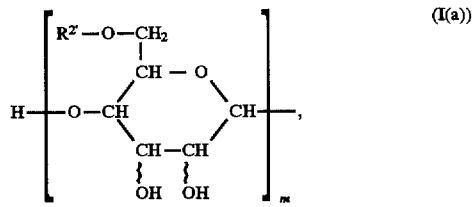

$R^2$ is H, or is represented by structure I(a) or structure I(b)

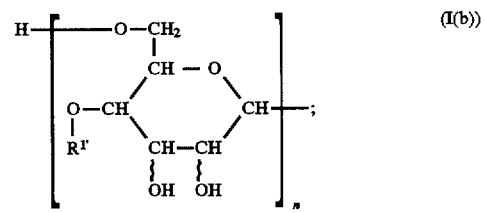

wherein $R^{1'}$ is H or is represented by structure I(a), $R^{2'}$ is H or is represented by structure I(a) or structure I(b), and wherein m and n are greater than or equal to 0 and X is the residue of a single α,β-ethylenically unsaturated moiety, said saccharide monomer being present in amounts effective to provide a freeze-thaw-stable latex coating composition; and an acrylic monomer selected from the group consisting of a $C_1$–$C_{10}$ alkyl ester of an α,β-ethylenically unsaturated monocarboxylic acid, a hydroxy $C_1$–$C_4$ alkyl ester of an α,β-ethylenically unsaturated monocarboxylic acid and a $C_4$–$C_8$ alkyl di-ester of an α,β-ethylenically unsaturated dicarboxylic acid.

2. The polymer of claim 1 comprising the polymerized residue of greater than 5 pphm of the saccharide monomer.

3. The polymer of claim 1 comprising the polymerized residue of from about 0.5 to about 10 pphm of the saccharide monomer.

4. The polymer of claim 1 comprising the polymerized residue of from 55 to 99.5 weight percent of the acrylic monomer, based on the sum total weight of the monomers used to prepare the polymer.

5. The polymer of claim 4 comprising the polymerized residue of at least 0.5 pphm of the saccharide monomer.

6. The polymer of claim 4 comprising the polymerized residue of from about 0.5 to about 10 pphm of the saccharide monomer.

7. The polymer of claim 6 wherein the α,β-ethylenically unsaturated moiety is selected from the group consisting of acrylamide, methacrylamide and α-methyl styryl moieties.

8. The polymer of claim 6 wherein the α,β-ethylenically unsaturated moiety is 3-isopropenyl-α,α-dimethylbenzylisocyanate.

9. The polymer of claim 3 further comprising the polymerized residue of from 0.2 to about 2 pphm of an ionic monomer selected from the group consisting of acrylic acid and methacrylic acid.

10. A polymer for use in preparing latex binders and latex coating compositions, said polymer comprising the polymerized residue of:
a polymerizable saccharide monomer which comprises the residue of a single α,β-ethylenically unsaturated moiety bonded to the residue of a saccharide moiety, said saccharide monomer being present in amounts effective to provide a freeze-thaw-stable latex coating composition,
an acrylic monomer selected from the group consisting of a $C_1$–$C_{10}$ alkyl ester of an α,β-ethylenically unsaturated monocarboxylic acid, a hydroxy $C_1$–$C_4$ alkyl ester of an α,β-ethylenically unsaturated monocarboxylic acid and a $C_4$–$C_8$ alkyl di-ester of an α,β-ethylenically unsaturated dicarboxylic acid; and
from 0.2 to about 2 pphm of an ionic monomer.

11. The polymer of claim 10 comprising the polymerized residue of greater than 5 pphm of the saccharide monomer.

12. The polymer of claim 10 comprising the polymerized residue of from about 0.5 to about 10 pphm of the saccharide monomer.

13. The polymer of claim 10 comprising the polymerized residue of from 55 to 99.5 weight percent of the acrylic monomer, based on the sum total weight of the monomers used to prepare the polymer.

14. The polymer of claim 13 comprising the polymerized residue of at least 0.5 pphm of the saccharide monomer.

15. The polymer of claim 13 comprising the polymerized residue of from about 0.5 to about 10 pphm of the saccharide monomer.

16. The polymer of claim 10 wherein the saccharide monomer is represented by Structure III,

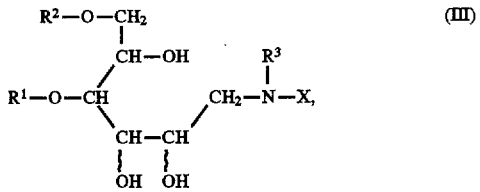

wherein, $R^1$ is H or is represented by structure I(a)

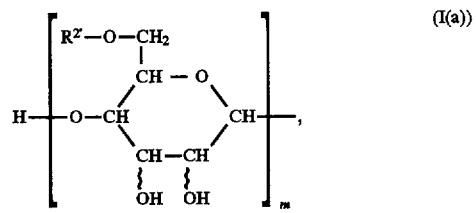

$R^2$ is H, or is represented by structure I(a) or structure I(b)

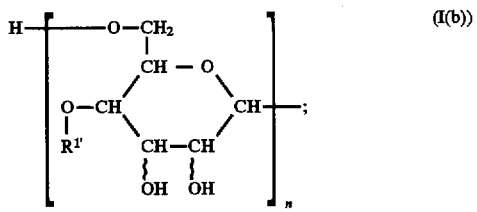

wherein $R^{1'}$ is H or is represented by structure I(a), $R^{2'}$ is H or is represented by structure I(a) or structure I(b), and wherein m and n are greater than or equal to 0 and X is the residue of the α,β-ethylenically unsaturated moiety.

17. The polymer of claim 16 wherein the α,β-ethylenically unsaturated moiety is selected from the group consisting of acrylamide, methacrylamide and α-methyl styryl moieties.

18. The polymer of claim 13 wherein the α,β-ethylenically unsaturated moiety is 3-isopropenyl-α,α-dimethylbenzylisocyanate.

19. The polymer of claim 10 wherein the ionic monomer is selected from the group consisting of acrylic acid and methacrylic acid.

* * * * *